United States Patent [19]

Weisner

[11] 3,799,680
[45] Mar. 26, 1974

[54] PHOTOMETER OPTICAL SYSTEM HAVING VIEWING MAGNIFICATION AND LIGHT ATTENUATION MEANS

[75] Inventor: Ralph M. Weisner, Canoga Park, Calif.

[73] Assignee: Kollmorgen Corporation, Holyoke, Mass.

[22] Filed: Jan. 3, 1972

[21] Appl. No.: 214,587

[52] U.S. Cl. .................... 356/225, 350/39
[51] Int. Cl. .............................. G01j 1/42
[58] Field of Search .......... 356/43, 49, 225; 350/37, 350/38, 39

[56] References Cited
UNITED STATES PATENTS

| | | | |
|---|---|---|---|
| 3,173,984 | 3/1965 | Vogl | 350/39 |
| 3,482,448 | 12/1969 | Gaffard | 356/43 |
| 3,536,408 | 10/1970 | Norwood | 356/225 |
| 3,343,449 | 9/1967 | Blackwell et al. | 356/225 |
| 3,187,574 | 6/1965 | Mason et al. | 356/49 |
| 2,552,940 | 5/1951 | Cornut | 350/39 |

*Primary Examiner*—Ronald L. Wibert
*Assistant Examiner*—Conrad Clark
*Attorney, Agent, or Firm*—Edward F. Jaros

[57] ABSTRACT

An optical instrument including means for selecting one of several magnifications of an image being viewed, the selective magnification means being positioned in a collimated light path between an objective lens and a viewing lens and without change of conjugate distances therebetween; also an aperture stop located at one conjugate plane of a relay lens, the other conjugate plane being the nodal plane of the objective lens, which serves as a light-attenuating means without interference with the viewing optical system or without affecting the field being measured.

5 Claims, 9 Drawing Figures

PATENTED MAR 26 1974 3,799,680
SHEET 1 OF 3
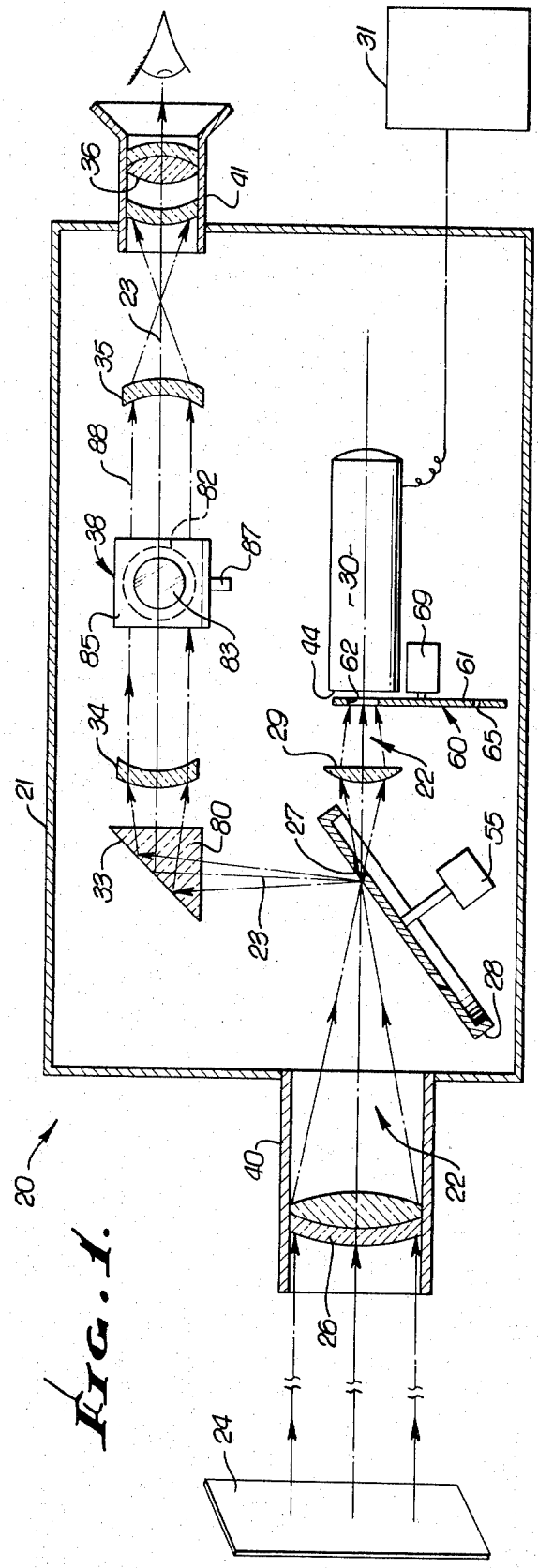
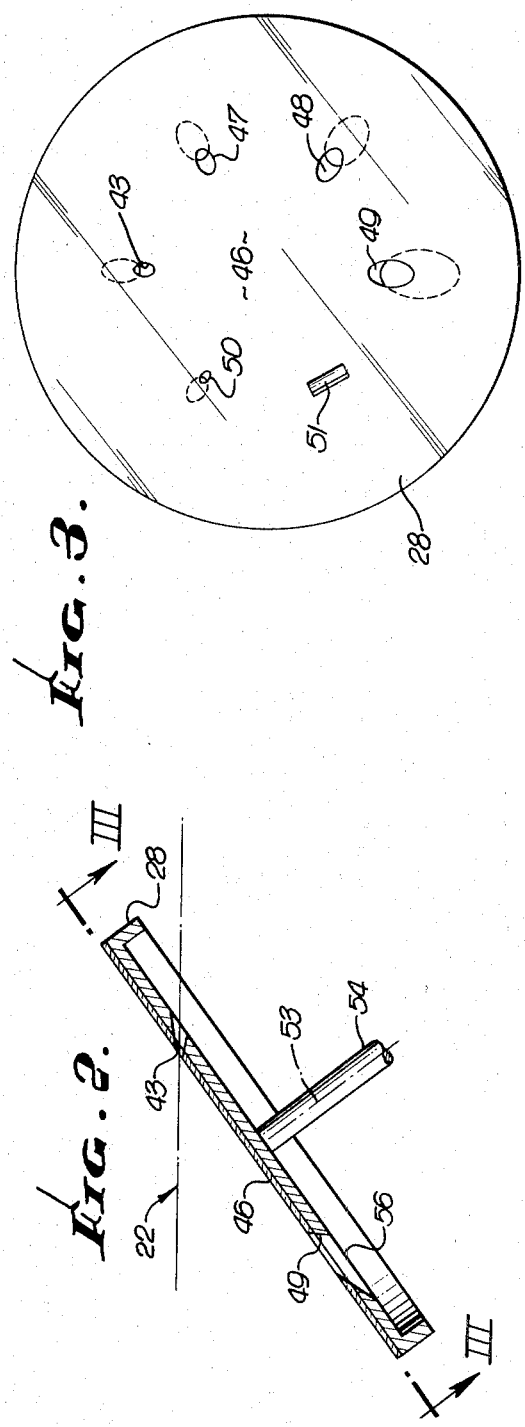

PHOTOMETER OPTICAL SYSTEM HAVING VIEWING MAGNIFICATION AND LIGHT ATTENUATION MEANS

BACKGROUND OF THE INVENTION

The invention is concerned with an optical system for use in photometry and illumination engineering. It is desirable in some instances in measuring light from a selected area of a subject being viewed to magnify the selected area without changing the field of view and to also attenuate the light falling upon a light sensitive surface of a photosensor or other light responsive or measuring device.

In prior proposed optical devices magnification of the subject or image being viewed was changed in various ways. In one system change of magnification was made by placing afocal lens in front of objective lens of the instrument for use as a telephoto or wide angle lens. In another optical system movable or rotatable members carrying lenses of different focal length were so mounted at the front of the optical system so that a selected lens could be placed in front of the objective lens. An example of such construction is a rotatable turret carrying a plurality of lenses of different focal length. Zoom lenses have also been substituted for such turrets. Another optical system such as a telescope, provided different viewing eyepieces or a zoom eyepiece to change magnification.

In such prior proposed systems, except for the use of the different eyepieces or zoom eyepiece to change magnification, the field of view of the optical system was modified and the light falling on the light sensitive surface of the photosensor was changed. When the viewing system included a through-the-lens system as used in various types of well-known photometers and photographic instruments, such change resulted in limitation of the field angle of the viewing system. In addition, such prior proposed systems required refocusing for each change of magnification.

The problem of attenuating light to increase the upper limit of an instrument's light measurement range was also previously treated by employing neutral density filters in the light-measuring portion of the optical system. In some instances iris diaphragms and other geometrical attenuators located behind the objective lens have been used to limit the system. Thus, prior proposed systems for obtaining a selected level of light at the image plane or light responsive surface affected the viewing angle or some other part of the optical system which resulted in additional operations, changes, and possible introduction of errors in order to measure the light characteristics at the surface of the photosensor.

The problem of making the photometer independent of focal position of the objective lens has been solved in the past by providing a fixed baffle or aperture behind the objective lens; such a baffle is called an "aperture stop" (or sometimes, a "T-stop"). Such fixed baffles have the disadvantage that they may cause vignetting of the optical system, and also do not allow for convenient interchange of objective lenses (since a fixed baffle is generally only ideal for one particular lens).

SUMMARY OF THE INVENTION

The present invention relates to a novel optical system for photometric instruments and the like wherein viewing image magnification and light attenuation for measurement is accomplished without the disadvantages of the prior proposed systems briefly mentioned above.

The present invention particularly relates to a novel optical system for a photometer useful in measuring luminance, radiance, color temperature, light polarization studies, and relative tri-stimulus values of a light source. Generally speaking, such an optical system includes an objective or primary lens directing light from a light source or a subject being viewed along a virtually uninterrupted light measuring path including a relay lens so that the light may reach a photosensor responsive surface with little or no polarization of the light. At the focal plane of the objective lens an apertured mirror is disposed at an angle to the optical axis of the objective lens to reflect light along a viewing light path. Such reflected light includes all of the light except that passing through the aperture in the mirror which passes the light along the measuring light path. In the viewing light path, means are provided for collimating the light path and magnification change means are located and are controllable for selection of one of several magnifications before the light is transmitted to the viewing eyepiece. Means to attenuate light along the measuring light path without interfering with the viewing light path and its magnification function may be positioned at the light sensitive surface of the photosensor to regulate or modify the amount of light at the surface and to also maintain the light at a constant light level regardless of focal setting of the objective lens.

Therefore, the primary object of the present invention is to disclose and provide a novel optical system for a photometric instrument.

An object of the present invention is to disclose and provide means for changing magnification of an image being viewed along a viewing light path without changing eyepieces or objective lens, and thereby providing magnification changes at low cost without extra optical parts and without possible loss of optical parts.

Another object of the invention is to disclose and provide a photometric optical system wherein magnification changes are accomplished without modifying or changing the eye relief of the system and without requiring refocusing upon each magnification change.

A more specific object of the present invention is to disclose and provide a magnification change means for an optical system including an afocal lens means operably positioned in a viewing light path and movable in said path to provide several magnifications of different order.

Another specific object of the present invention is to disclose an optical system wherein magnification change means include the mounting of an afocal lens system in a viewing light path wherein spaced lens of the afocal lens system are carried on frame members connected for rotation or movement into at least one of several different positions.

A still further object of the present invention is to disclose and provide a photometric optical system wherein T-stop means are positioned at a selected point in a measuring light path whereby a constant or uniform light level condition will be maintained with respect to the light sensitive surface of a photosensor device regardless of focal setting of the objective lens.

A still further object of the present invention is to disclose and provide a novel location for a light attenuator means in a light measuring path whereby changes in attenuation have no effect upon light in the viewing light path.

The present invention contemplates a T-stop system for a photometric optical system wherein the light attenuation means is designed and arranged to provide a range switch to different light levels by providing a rotatable disc with a plurality of holes circularly arranged therein for successive selective positioning in the light measuring path, each light transmitting hole being related in area to an adjacent hole by a preselected factor such as 10.

A general object of the invention is to disclose and provide a novel optical system for use in viewing and measuring light from a subject or image which is simple, compact and inexpensive and which may be readily adapted to related optical systems for providing a plurality of magnification changes and light measurement over selected extended ranges of light levels.

Various other objects and advantages of the present invention will be readily apparent from the following description of the drawings in which exemplary embodiments of the invention are shown.

In the drawings:

FIG. 1 is a generally schematic sectional view of an optical system embodying this invention, the section being taken in a vertical plane through an instrument incorporating the optical system;

FIG. 2 is a fragmentary enlarged sectional view of a light transmitting and reflecting means which may be used in said optical system;

FIG. 3 is a plan view of the means shown in FIG. 2, the view being taken along the plane indicated by line III—III of FIG. 2;

DESCRIPTION OF THE PREFERRED EMBODIMENT

Figure 4:
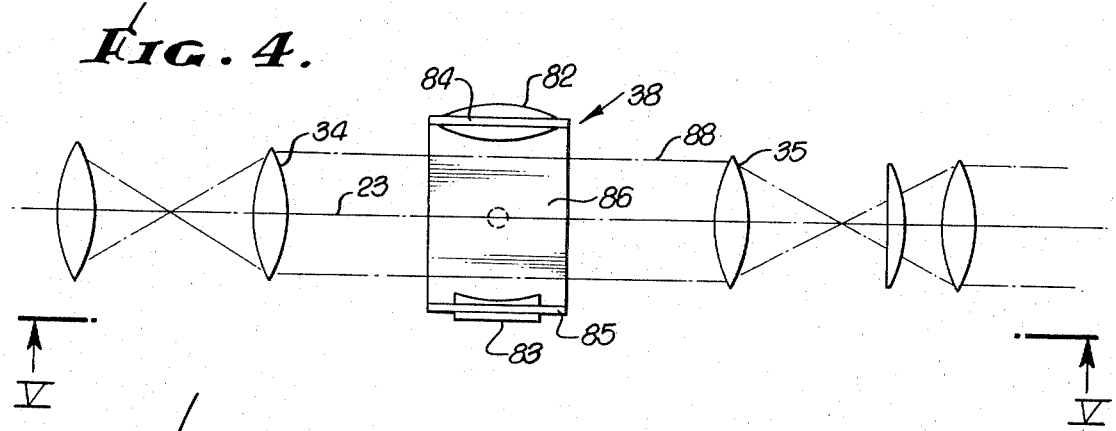
FIG. 4 is an enlarged schematic view of the optical system including the viewing light path of the system shown in FIG. 1 and showing magnification means in the operative position in the viewing light path.

Referring to the drawings, FIG. 1 shows schematically a photometric apparatus, generally indicated at 20, embodying the optical system of this invention. Photometric apparatus 20 generally includes a suitable housing 21 for elements of the optical system which includes a measuring light path, generally indicated at 22, and a viewing light path, generally indicated at 23. The measuring light path transmits light from a subject or source being viewed, indicated schematically at 24. Generally, the measuring light path includes a primary or objective lens 26, an aperture 27 provided in a reflecting mirror 28, a relay lens means 29, and a photosensor 30. The photosensor is operably connected in well-known manner to a control unit and power supply generally and schematically indicated at 31. Viewing light path 23 generally includes the reflecting surface of the mirror 28 which directs light to a prism 33 which reflects light to a collimating lens 34 for transmission to an erector or decollimating lens 35 spaced therefrom. An eyepiece 36 permits viewing of the subject 24 along the viewing light path. In the collimated portion of the viewing light path between lens 34 and 35 is rotatably mounted an afocal lens system generally indicated at 38.

In detail, housing 21 may be of any suitable construction and form. Housing 21 may be generally rectangular and provided with forwardly projecting objective lens-carrying cylinder or tube 40 which may be made of relatively rotatable portions for focusing of the objective lens 26, such rotatable parts being not shown because they are well known. The housing 21 also includes a rearwardly projecting smaller cylinder means 41 providing a mounting for the eyepiece lens 36. Cylinder 41 may also include relatively rotatable parts associated with the eyepiece lens to provide a well-known type of monocular readily adjustable to the eye of the observer. Housing 21 on its outer wall surfaces (not shown) may include suitable controls for mechanically operating parts of the optical system, such controls not being described because they are well known.

Measuring light path 22, as mentioned above, includes the primary or objective lens 26 which are suitably mounted in cylinder means 40 for convenient focusing on the subject or source 24. Objective lens 26 is of well-known construction and directs light to the aperture mirror 28, the aperture of which lies in the focal plane of lens 26. In this example a single aperture 43 is positioned at the measuring light path and transmits light along the optical axis of the measuring light path to relay lens 29 which has a front focal plane at the objective lens and a back focal plane the light sensitive surface 44 of the photosensor 30. Relay lens 29 serves to relay the photons passing through the aperture 43 to light responsive surface 44, and also serves to integrate or average-out the spatial distribution of light within the measuring field.

Aperture wheel 28 with respect to the measuring light path serves to define a smaller or lesser field of view received by objective lens 26 within such larger field of view accepted by objective lens 26. The aperture mirror 28 may comprise a metal mirror such as aluminum, stainless steel, beryllium, chrome plated copper, gold, silver, and the like; or a metallic coated mirror, for example, aluminized plastic, glass or epoxy and the like, such mirrors having a physical hole made through the material of the mirror by suitable methods such as casting, drilling, chemical etching, electrical-discharge-machining, or chemically plating a mirror surface on a predrilled metallic blank. In an aluminized glass mirror in which the reflectant material is deposited on the front surface of the mirror a virtual hole may be provided by removing a selected area of the deposited coating by any suitable process, such as chemical etching.

Mirror wheel 28, FIGS. 2 and 3, has a reflecting surface 46 as described above and a plurality of circularly arranged apertures 43 and 47–50 inclusive of generally elliptical form and a rectangular aperture 51. Aperture mirror 28 is mounted for rotation about an axis 53 defined by a shaft 54 engaged by suitable gear means, schematically indicated at 55, to permit incremental rotation of mirror 28 to rotate and position in register with the measuring light path 22 each of the apertures in the mirror. Each aperture in mirror 28 is illustrated as being of oval or elliptical shape at the reflecting surface 46, each of such openings being outwardly flared or enlarged as at 56. Such shape of the aperture openings in the mirror 28 is made so that the projection through any one of said openings will appear on the photosensor surface as a circle since the plane of the mirror 28 is at a selected angle to the measuring light path. It will be understood that such angular relationship between the measuring light path and the mirror may be varied depending upon the geometry of the viewing light path and that the measuring area or shape of the front opening of the apertures in the mirror may be square, trapezoidal, star-shaped, or any other selected and desired shape. The means for rotating the mirror 28 is preferably provided with positioning stops (not shown) to precisely register an aperture in the measuring light path. However, as described later, precise registration of the aperture is not necessary since the image seen by the observer along the viewing light path will accurately define the area of the subject or test source being measured. The several apertures 46–51 and 43 vary in area thus permitting the observer to increase or decrease the measuring field. While the aperture mirror is illustrated at approximately 45° to the measuring light path 22, it will be understood that the angle of the mirror may vary from 10° to 80° and preferably between 30° to 60°.

Photosensor 30 which is provided with a light responsive surface 44 may be a suitable well-known type of photomultiplier tube adapted to measure the light falling upon surface 44. It will be apparent that the photons passing through aperture 43 are relayed by relay lens 29 to the light sensitive surface 44 for measurement.

Figure 8:
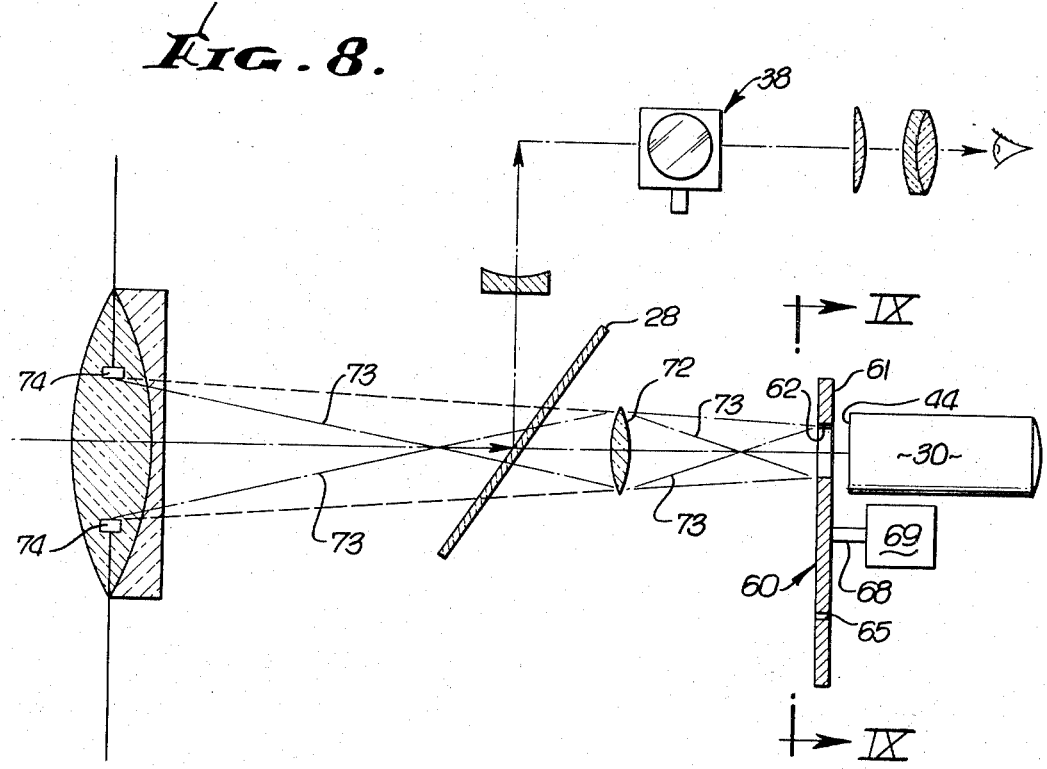
FIG. 8 is a schematic view of a photometric optical system similar to that shown in FIG. 1 and including T-stop or light attenuating means in the light measuring path.
Figure 9:
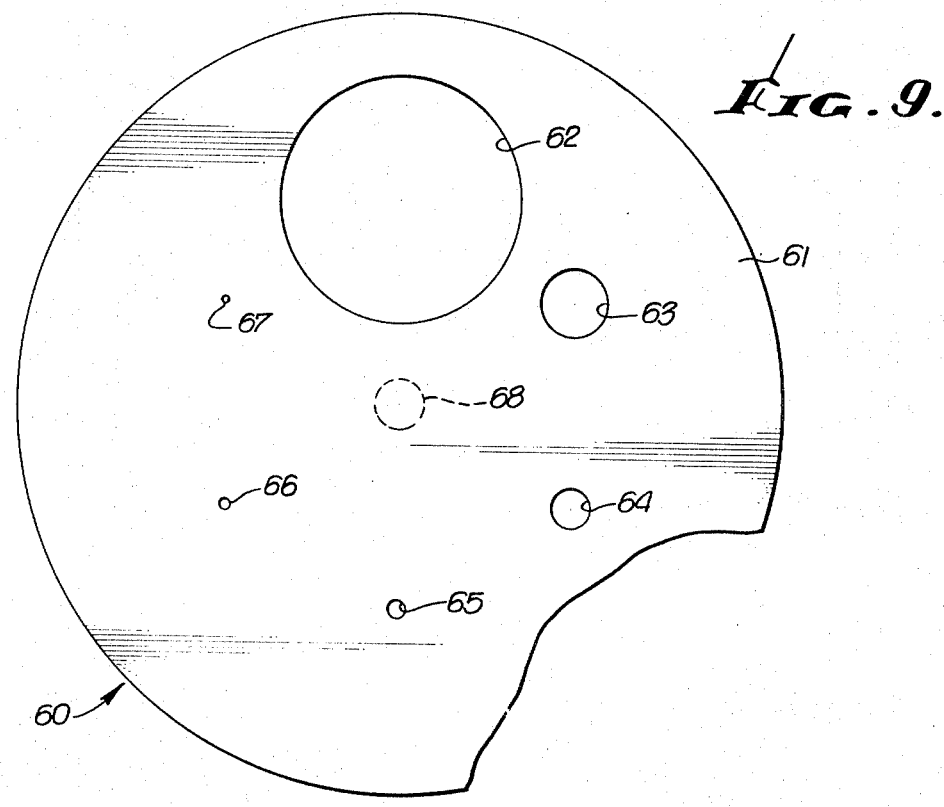
FIG. 9 is a fragmentary enlarged view taken in the plane indicated by line IX—IX of FIG. 8.

Means for "T-stopping" the measuring light path without insertion of a physical aperture means at the objective lens is shown at 60, FIGS. 8 and 9. FIG. 8 schematically indicates the operation of the T-stop means 60 which comprises a rotatable disc 61 located in a plane proximate to the plane of the light sensitive surface 44 of the photosensor 30. Disc 61 may have a single opening or hole 62 therein of selected area. As illustrated, disc 61 includes a hole such as 62 and a plurality of progressively smaller holes 63, 64, 65, 66 and 67 in which each hole has ten times less area than the preceding hole. Thus, in effect a multiple range switch for transmitting different amounts of light of the same intensity or light level to the sensitive surface 44 is provided by disc 61.

Disc 61 may be rotatably mounted about a shaft 68 having an axis parallel to the light measuring path at photosensor 30, said shaft 68 being connected to suitable means generally indicated at 69 for connection to a control exterior of housing 21 for turning the disc to a selected registered position with respect to surface 44 and the measuring light path.

In FIG. 8 light to be measured passing through aperture mirror 28 and forming an image at the measuring aperture is relayed by an integrator or relay lens 72 to the T-stop aperture or hole 62. Integrator lens 72 is focused at the position of maximum clear aperture of the objective lens 26 when the objective lens is focused on the nearest object. This clear aperture image is projected by the integrator lens on the photo detector. FIG. 8 illustrates the projection of a T-stop 62 to the objective lens as indicated by light ray lines 73 which form a projected aperture stop 74 at objective lens 26. The largest opening for T-stop purposes which may be made in disc 61 depends upon the objective clear aperture, focal length, and near focus point of the objective lens.

It will be apparent to those skilled in the art that the above-described arrangement of T-stopping the measuring light path maintains for each aperture or hole 62–67 the light level reaching the image plane at the light sensitive surface 44 at a uniform or constant light level and that this constant light level is independent of the focal position of the objective lens 26. Furthermore, this method of T-stopping does not result in vignetting of the field of view (which may cause uneven weighting of different goniophotometric distributions), but also allows for rapid interchange of different objective lenses without need for a separate T-stop for each lens. Moreover, since a given hole diameter at 62 describes a fixed T-stop, independent of lens focal length, this system eliminates the variations in transmission or T-stop which is normally incurred when using zoom lenses. In addition, the T-stop means of this invention does not modify, change, or affect the measuring field which is defined by the aperture mirror 28. Moreover, when a plurality of openings or holes are employed in the T-stop wheel, neutral density filters are not required to attenuate light reaching the light sensitive surface 44 of the photosensor and, therefore, high light levels may be measured without incurring errors due to spectral selectivity of neutral density filters.

Viewing light path 23 provides a means for visually observing the area of the subject or source 24 from which the light being measured is received by the objective lens 26. Mirror surface 46 on the aperture mirror 28 reflects along the viewing path an image of the subject 24 which is larger than the area or part of the subject from which light is measured along the measuring light path. The area measured is represented by the aperture 27 or other aperture positioned at the focal plane of the objective lens 26 and such area appears to the observer as a black spot since no light is reflected from the aperture opening from the area of the subject being measured. Precise location of the spot is determined by the observer because of viewing the surrounding area of the subject 24.

In an optical system for a photometer including a viewing light path which does not include magnification change means 38 such a photometer being known as a "Pritchard photometer," the reflected light is transmitted along a viewing path to an eyepiece without magnification of the image transmitted thereby. In the present invention, the viewing light path includes a suitable light reflecting surface 33 which may be provided on the surface of a prism 80 arranged in a plane substantially parallel to the plane of aperture mirror 28. Light reflected from surface 33 is transmitted to a collimating lens 34 which provides parallel light beams to transmit the image to the erector or decollimating lens 35. In the collimated portion of a viewing light path which lies between the spaced lenses 34 and 35, the present invention provides magnification change means 38.

Magnification change means 38 comprises an afocal lens system comprising spaced afocal lens elements 82 and 83 mounted on upstanding members 84 and 85 of a frame 86 of generally wide U-section or tubular in form. Frame 86 is supported centrally between frame members 84 and 85 by a pivot shaft 87 which may be suitably mounted in the housing 21 in the collimated portion 88 of the viewing light path. External control means are provided (not shown) for rotating the frame 86 to selectively position the afocal lens means in one of several positions as described hereafter.

In FIG. 4 frame 86 and the afocal lens system is illustrated in inoperative position. Lens elements 84 and 83 are positioned with their optical axes at right angles to the viewing light path 23 and beyond the marginal rays of the collimated light portion 88. Thus, the image viewed along the viewing light path will be of normal magnification.

Figure 5:
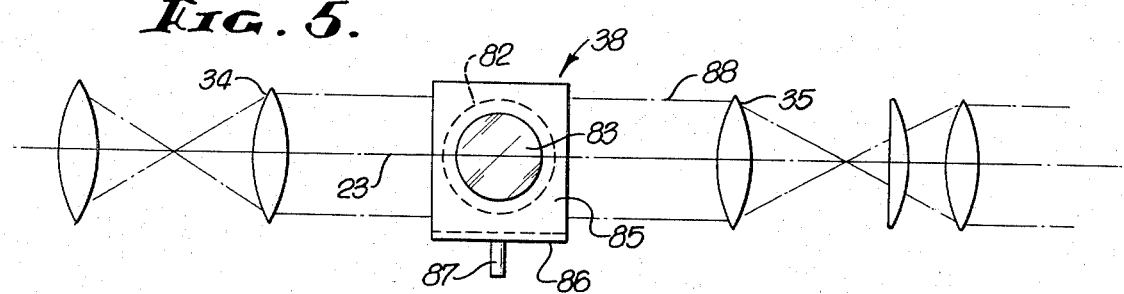
FIG. 5 is a view of the optical system shown in FIG. 4 and is taken from the plane indicated by line V—V of FIG. 4.
Figure 6:
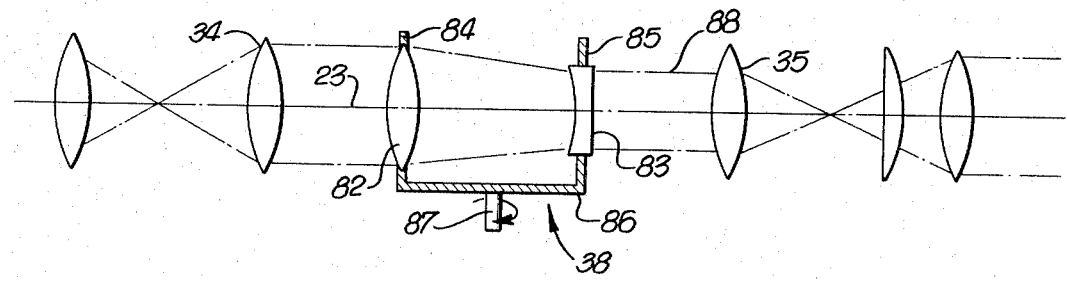
FIG. 6 is a view similar to FIG. 5 and shows the optical system of the viewing light path with the magnification means in one position.

In FIG. 6 frame 86 and afocal lens elements 82 and 83 are rotated 90° from the position shown in FIGS. 4 and 5 and are so located in the viewing light path 23 to position the lens elements 82 and 83 to provide maximum magnification. The afocal lens magnifier increases magnification of the optical system by a factor M which is the magnification of the afocal magnifier.

Figure 7:
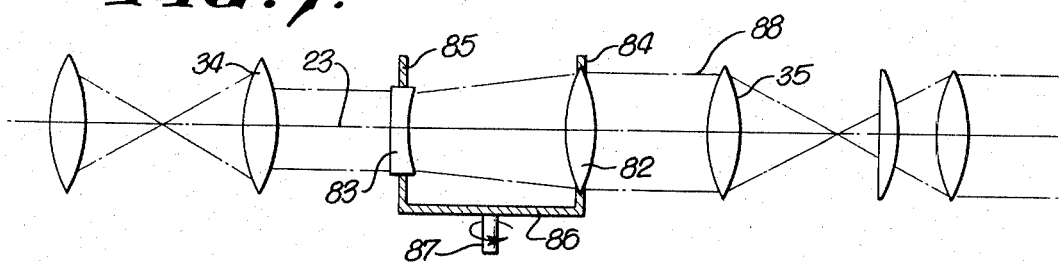
FIG. 7 is a view similar to FIG. 6 and shows the magnification means in another position.

In FIG. 7 the afocal magnifier system has been rotated 180° from the position shown in FIG. 6 so as to position the afocal magnifier lens elements 83 and 84 to reduce the normal magnification by a factor of 1/M. Such position of the afocal magnifier elements will give minimum magnification.

It will be understood that the viewing magnification can be varied by a factor $M^2$ because the ratio of the two magnifications is M divided by 1/M. Since M for a typical photometric optical system for this purpose may be from 2× to 4×, this ratio may then be from about 4× to 16×. It will thus be apparent that the rotatable afocal magnifier lens system placed in a collimated beam portion provides for three magnifications, namely M, 1/M, and unity.

It may be noted that since the afocal magnifier system is located in a collimated light beam portion, the placement of the afocal magnifier is not critical. By utilizing the afocal magnifier elements in a collimated beam portion in the viewing light path, changing of the eyepiece optics or the objective lens to obtain magnification of the image is not required. In addition the magnifying optical system of the present invention is parfocalized and refocusing is not required when magnification is changed; when the magnification is changed, the eye relief remains constant and exit pupil diameter remains nearly constant.

A photometric optical system embodying the invention described above provides a simple, effective, readily operated optical system in which magnification of the viewed image may be accomplished without changing the measured light and the measured light may be held constant while magnification changes are made. Moreover, the measured light may be attenuated without affecting the viewed image or magnification of the viewed image. Furthermore, the focal position of the objective lens may be varied over wide limits with no appreciable change in photometric sensitivity.

In addition, the spatial distribution of light within the measuring field is integrated or averaged-out across the face of the photodetector, thereby eliminating photometric errors due to sensitivity variations across the face of the photosensor.

The aperture mirror described in this optical system is the subject of the co-pending patent application Ser. No. 214,588 filed by Richard A. Walker and Ralph M. Weisner and owned by the same assignee.

Various modifications and changes may be made in the optical system described above which come within the spirit of this invention and all such changes coming within the scope of the appended claims are embraced thereby.

I claim:

1. In an optical system for a photometer having a viewing light path including a collimating lens, erector lens, and a viewing eye piece for observing the area from which light is being measured and a separate light path to measure said light, the combination of:
   an objective lens providing a light path;
   a mirror member positioned in the path of light transmitted by said objective lens and reflecting all wave lengths of said light at virtually unchanged intensity along a viewing light path;
   magnifying means between said collimating lens and erector lens for the image transmitted in said viewing light path;
   an opening in said mirror member at the focal plane of the objective lens to transmit light along a light measuring path,
   said opening in said mirror member being viewable in said viewing light path as a black area;
   a relay lens in said light measuring path having a front focal plane at said objective lens;
   a photosensor having a photoresponsive surface at the back focal plane of the relay lens;
   and a T-stop aperture means adjacent the responsive surface of the photosensor to attenuate the intensity of light being measured as transmitted by said relay lens and without modification of the intensity of light reflected by said mirror member to said viewing light path.

2. In an optical system as stated in claim 1 wherein the maximum aperture of the T-stop means is related to the maximum clear aperture of said objective lens when said objective lens is focused on the nearest object.

3. In an optical system as stated in claim 1 wherein said T-stop aperture means includes
   a plurality of openings, each related in area to other openings by a selected multiplier whereby said T-stop means is adapted for use as a means for switching to different selected light levels.

4. In an optical system as stated in claim 1 wherein said T-stop means includes a movable member having a plurality of light limiting openings of different area positionable in said light measuring path.

5. In an optical system as stated in claim 1 wherein said means for magnifying said image includes means providing a collimated light path portion in said viewing light path;
and an afocal magnifying lens means rotatable about an axis normal to the collimated light path portion and in said collimated light path portion for changing magnification of the image transmitted thereby.

* * * * *